UNITED STATES PATENT OFFICE.

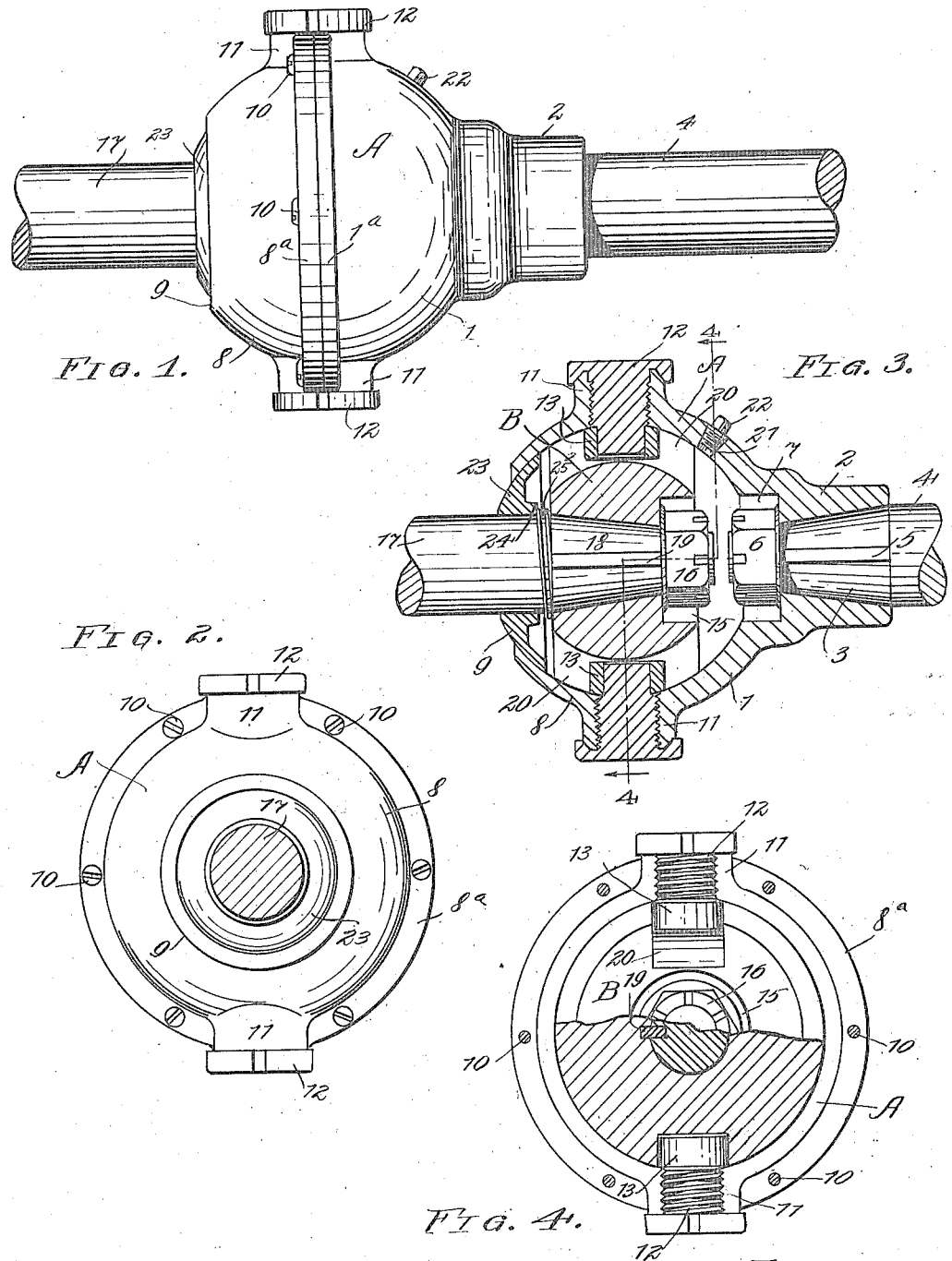

ADOLPH HOHMANN, OF CLEVELAND, OHIO, ASSIGNOR OF ONE-THIRD TO CHARLES C. FISHER, OF CLEVELAND, OHIO, AND ONE-THIRD TO HENRY ZELINSKI, OF WEST PARK, OHIO.

UNIVERSAL JOINT.

1,123,533.      Specification of Letters Patent.      Patented Jan. 5, 1915.

Application filed April 24, 1913. Serial No. 763,255.

*To all whom it may concern:*

Be it known that I, ADOLPH HOHMANN, a subject to the Emperor of Germany, residing at Cleveland, in the county of Cuyahoga and State of Ohio, have invented a certain new and useful Improvement in Universal Joints, of which the following is a full, clear, and exact description, reference being had to the accompanying drawings.

This invention relates to improvements in universal joints, such as are commonly used between the sections of the driving shafts of automobiles; and it has for its object the provision of a novel construction for devices of this character whereby said devices will accommodate extreme variations in the angular relation between the shaft sections; which permits of no lost motion between the parts thereof and thereby insures noiseless operation at any angle and the elimination of the disagreeable and injurious pounding which is present in prevailing types of universal joints with which I am familiar; which is very strong; which provides for effective lubrication, and which permits of easy assembling and disassembling for the purpose of inspection or repair.

Further objects will become apparent as this description proceeds, reference being had to the accompanying drawings forming part hereof, wherein—

Figure 1 is a side elevation of my improved universal joint applied to the adjacent ends of a divided shaft; Fig. 2 is an end elevation thereof as viewed from the left of Fig. 1; Fig. 3 is a central longitudinal section through the joint, a portion of each of the shaft sections being shown in elevation; and Fig. 4 is a transverse section, taken substantially on the line 4—4 of Fig. 3 and looking in the direction of the arrows.

In the drawings, wherein similar reference numerals designate corresponding parts throughout the several views, 1 represents a substantially semi-spherical casing member having a sleeve 2 extending from one side thereof which is provided with a central tapered bore for the reception of the tapered end 3 of the shaft section 4, a key 5 being employed to lock the parts against independent rotation. A nut 6 which is threaded upon the reduced inner end of the shaft section 4 holds the parts firmly together, a recess 7 being formed in the inner surface of the casing member for the accommodation of the nut. The casing is completed by a member 8 which is also substantially semi-spherical in shape and is provided with an opening 9, diametrically opposite the extension 2 of the casing member 1. The adjacent edges of the casing members 1 and 8 are provided with flanges 1$^a$ and 8$^a$, respectively, and screws 10, which pass freely through the flanges 8$^a$ and are threaded into the flange 1$^a$, securely hold the casing members together. At diametrically opposite points the flanges 1$^a$ and 8$^a$ are enlarged to provide bosses 11 which are internally threaded for the reception of the screws 12. The inner surfaces of the heads of these screws are provided with annular grooves having their outer walls tapered to correspond to and coöperate with the frusto-conical outer ends of the bosses 11 and tend, when the screws are in position, to assist in securing the casing members together. The inner ends of the screws 12 are reduced to form bearings for the antifriction rollers 13.

Contained within the casing just described (which will be referred to hereinafter as the outer member of the universal joint and is designated generally by the reference letter A in the drawings) is the inner member B, which is formed by the segment of a spherical block, the bases whereof are equally spaced from the center. A central tapered bore extends through the member B and has its longitudinal axis at right angles to the planes of truncation, and the flat side of the member B adjacent the smaller end of the aforesaid bore is recessed at 15 for the accommodation of a nut 16 which is threaded upon the reduced end of the shaft section 17 to effectively hold the tapered portion 18 thereof in the bore of the member B, the shaft and the member B being locked against independent rotation by the key 19.

Two circumferential grooves 20 are formed in the outer face of the member B, diametrically opposite each other, and are parallel to the longitudinal axis of the shaft section 17. The rollers 13, which are carried by the inner ends of the screws 12, are adapted to traverse the grooves 20, the width of said grooves being only enough greater than the diameter of the rollers 13 to permit of the required clearance and the sides of said grooves being parallel.

It will be seen from the foregoing description that I have provided a universal connection between shaft sections which involves the principle of a ball-and-socket joint, the driving connection between the inner and outer members of the joint comprising a pair of diametrically opposed rollers which are carried by the outer member and which operate in grooves in the inner member, it being remembered that said grooves are only enough wider than the diameter of the rollers to provide the required clearance and that the sides thereof are parallel. In such a construction the possibility of rattle is reduced to a minimum, and is entirely eliminated when a proper lubricant is introduced into the joint, as through the opening 21 in the casing A, adapted to be closed by the plug 22.

To cover the opening 9 in the casing member 8 (which must necessarily be of sufficient size to permit of the extreme movements of the shaft section 17 in all directions) and to retain the lubricant within the casing, I provide a cap 23 which has a spherical outer face of the same radius as the interior of the casing and which is provided with a central hub 24, slidably mounted upon the shaft section 17. Interposed between the adjacent flat face of the member B and the end of the hub 24 is a spiral spring 25 which acts to press the cap 23 tightly against the inner surface of the casing member 8 and effectively close the opening 9 at all times.

Having thus described my invention what I claim is:

1. A universal joint comprising a hollow, substantially spherical outer member having a hollow cylindrical extension projecting from one side thereof which is adapted to receive the end of a shaft section and having in its opposite wall an opening which is concentric with said shaft section, said outer member being divided transversely on a plane substantially coincident with the center thereof, the adjacent edges of the parts having coöperating flanges which are enlarged at diametrically opposite points to form bosses having outer frusto conical ends and which are threaded internally, screws within said bosses which are provided with heads having grooves which embrace the outer ends of the bosses and having reduced inner ends, rollers journaled thereon, a spherical segment within the casing having a central bore extending therethrough at right angles to its bases for the reception of the end of a second shaft section and having a pair of circumferential grooves which are in alinement with the second shaft section and which have parallel sides, the aforesaid rollers occupying and being adapted to traverse said grooves, a cap which is of the form of a sphere section slidably mounted upon the second shaft section adjacent the spherical segment and which is adapted to cover the opening, and a spring interposed between the cap and the adjacent base of the segment.

2. A universal joint comprising a hollow, substantially spherical outer member, said outer member being divided transversely on a plane substantially coincident with the center thereof, the adjacent edges of the parts having coöperating flanges which are enlarged at diametrically opposite points to form bosses having outer frusto conical ends and which are threaded internally, screws within said bosses which are provided with heads having frusto-conical grooves which receive the frusto-conical outer ends of the bosses and having reduced inner ends, rollers journaled on said ends, and a spherical segment within the casing having a central bore extending therethrough at right angles to its bases for the reception of the end of a second shaft section and having a pair of circumferential grooves which are in alinement with the second shaft section and which have parallel sides, the aforesaid rollers occupying and being adapted to traverse said grooves.

3. A universal joint comprising an outer member that is adapted to be secured to the end of a shaft section and having a spherical chamber, said member being divided transversely on a plane substantially coincident with the center of said chamber, the adjacent edges of the parts having coöperating flanges, the flange of one of the parts having a series of screw holes and the flange of the other part having a series of threaded apertures which are arranged to aline with the aforesaid holes, screws which pass freely through the holes and are threaded within said apertures, the flanges being enlarged at diametrically opposite points to form bosses having outer frusto-conical ends and which are threaded internally, screws within said bosses which are provided with heads having grooves which embrace the outer ends of the bosses, said screws having extensions, and a spherical segment within the casing that is adapted to be secured to the end of a second shaft section and having a pair of circumferential grooves which are in alinement with the second shaft section and into which the extensions of the aforesaid screws are arranged to project.

4. A universal joint comprising an outer member that is adapted to be secured to the end of a shaft section and having a spherical chamber, said member being divided transversely on a plane substantially coincident with the center of said chamber, the adjacent edges of the parts having coöp- erating flanges which are enlarged at diametrically opposite points to form bosses having outer frusto-conical ends and which are threaded internally, screws within said bosses which are provided with heads having grooves which embrace the outer ends of the bosses, said screws having extensions, and a spherical segment within the casing that is adapted to be secured to the end of a second shaft section and having a pair of circumferential grooves which are in alinement with the second shaft section and into which the extensions of the aforesaid screws are arranged to project.

In testimony whereof, I hereunto affix my signature in the presence of two witnesses.

ADOLPH HOHMANN.

Witnesses:
 ROBERT F. JUDISCH,
 BRENNAN B. WEST.